United States Patent
Cheu et al.

(10) Patent No.: US 7,505,379 B2
(45) Date of Patent: Mar. 17, 2009

(54) INTELLIGENT LAYER JUMP METHOD

(75) Inventors: Shih-Chang Cheu, Taipei (TW); Chih-Ming Lai, Taipei (TW); Po-Chen Huang, Taipei (TW); Chih-Chung Chiao, Taipei (TW)

(73) Assignee: Lite-On It Corporation, Taipei (TW)

( * ) Notice: Subject to any disclaimer, the term of this patent is extended or adjusted under 35 U.S.C. 154(b) by 588 days.

(21) Appl. No.: 11/152,197

(22) Filed: Jun. 15, 2005

(65) Prior Publication Data

US 2005/0276176 A1 Dec. 15, 2005

(30) Foreign Application Priority Data

Jun. 15, 2004 (TW) .............................. 93117222 A (51) Int. Cl.
*G11B 7/00* (2006.01)

(52) U.S. Cl. ................. 369/44.25; 369/44.28

(58) Field of Classification Search ........................ None
See application file for complete search history.

(56) References Cited

U.S. PATENT DOCUMENTS 6,002,655 A * 12/1999 Ono et al. ................. 369/44.27

\* cited by examiner

*Primary Examiner*—Joseph Feild
*Assistant Examiner*—Joseph Haley
(74) *Attorney, Agent, or Firm*—Bacon & Thomas, PLLC (57) ABSTRACT

An intelligent layer jump method applied when an optical disc drive accesses a disc. The disc has a central reference point, at least a first recoding layer and a second recoding layer. The first recoding layer has a plurality of first tracks, while the second recoding layer has a plurality of second tracks. Firstly, a laser beam of the optical disc drive is focused on the first recoding layer to form a focal point and obtain an original position. Then, the relative position between an original position and a target position positioned on the second recoding layer are compared to determine a layer jump and track seeking path of the focal point. Lastly, the focal point is shifted from the original position to the target position according to the predetermined layer jump and track seeking path.

16 Claims, 8 Drawing Sheets

INTELLIGENT LAYER JUMP METHOD

This application claims the benefit of Taiwan application Ser. No. 93117222, filed Jun. 15, 2004, the subject matter of which is incorporated herein by reference.

BACKGROUND OF THE INVENTION

1. Field of the Invention

The invention relates in general to an intelligent layer jump method, and more particularly to an intelligent layer jump method applied in optical disc drive.

2. Description of the Related Art

Along with the increasing demand in high-capacity optical recording medium, digital versatile disc (DVD) with more than two recoding layers has gained a great popularity and plays an important role in electronic products. When accessing a DVD disc, the stability and efficiency have become an imminent target for manufacturers in the industry to achieve.

Figure 1:
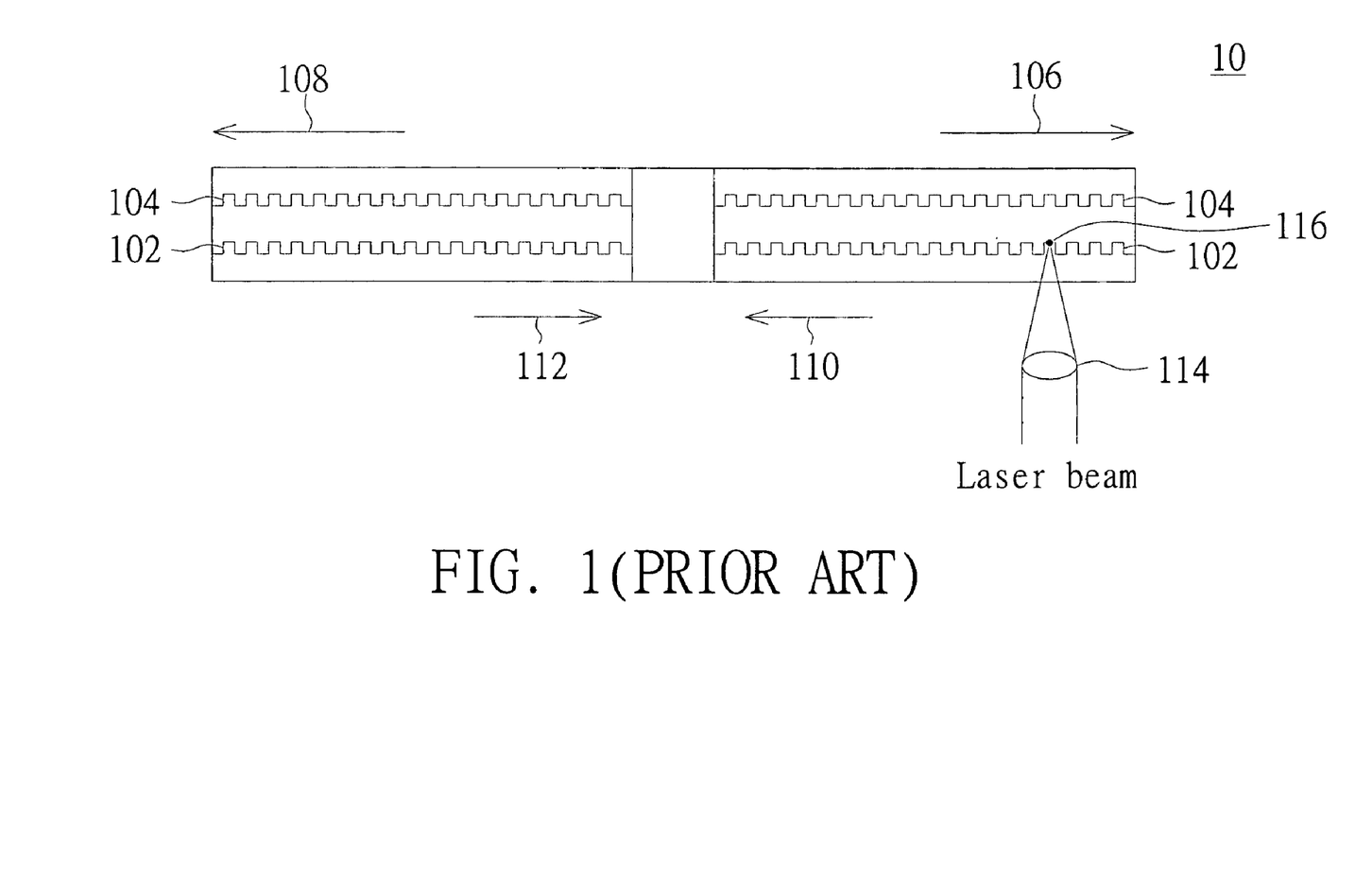
FIG. 1 (Prior Art) is a sectional view of the conventional dual layer disc.

An optical disc drive accesses data by rotating the disc, shifting an optical pick-up head along the radial direction of the disc, and emitting a laser beam onto the recoding layer disposed on the optical disc. Referring to FIG. 1, a sectional view of the conventional dual layer disc is shown. Disc 10 has a first recoding layer 102 and a second recoding layer 104, wherein data are stored between the two recoding layers. In the diagram, two solid arrows 106 and 108 are pointed to a direction departing from the center of the disc, while two solid arrows 110 and 112 are pointed towards the center of the disc. The laser beam is firstly focused on the predetermined recoding layer via an objective lens 114, and then reflected back to the optical detector (not shown in the diagram) of the optical pick-up head.

Figure 2:
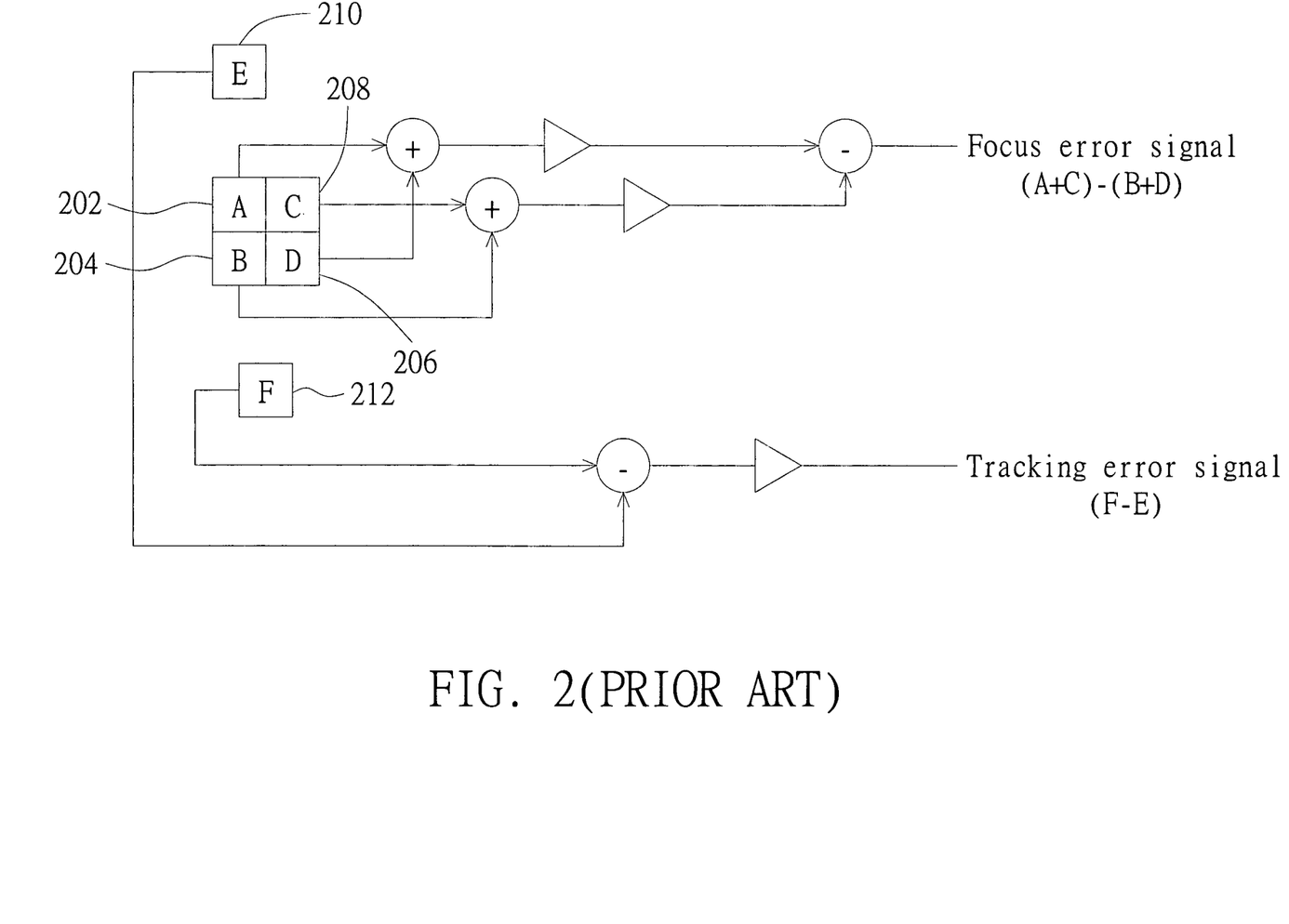
FIG. 2 (Prior Art) is a diagram illustrating the disposition of the optical pick-up head on the optical detector.

Referring to FIG. 2, a diagram illustrating the disposition of the optical pick-up head on the optical detector is shown. The optical detector comprises 6 photo-dioxides, wherein the part comprising photo-dioxides 202, 204, 206, 208 can be used to generate a focus error (FE) signal whose intensity is expressed as FE=(A+C)−(B+D), while another two photo-dioxides 210, 212 are the source for generating a tracking error (TE) signal whose intensity is expressed as TE=(F−E).

Figure 3A:
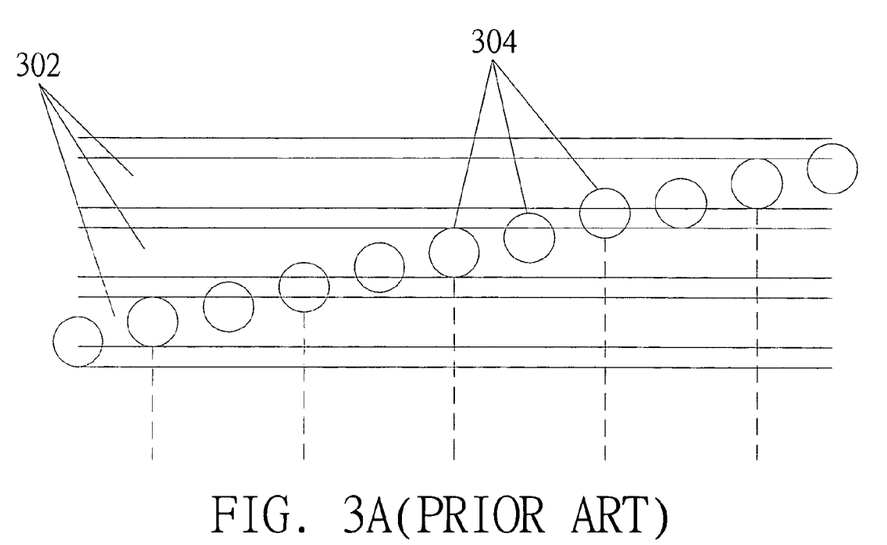
FIG. 3A (Prior Art) is a diagram illustrating the cross tracking of the laser beam.
Figure 3B:
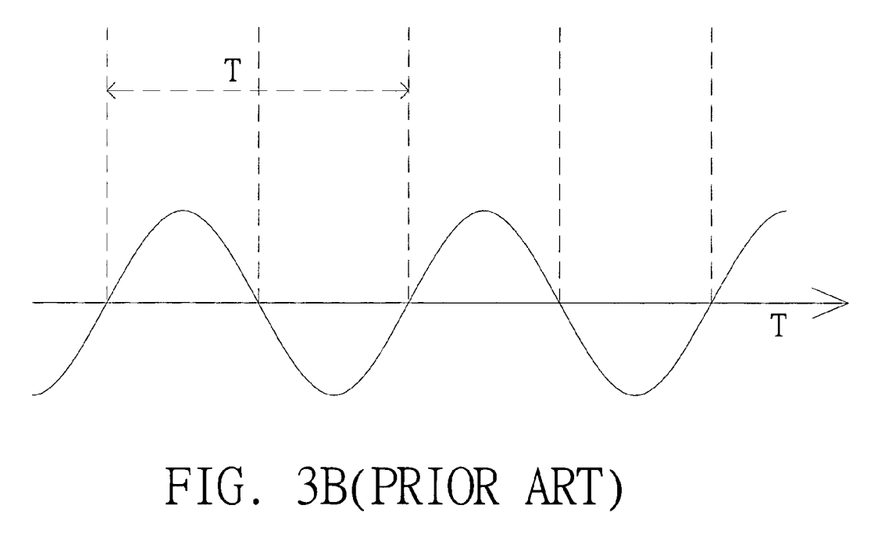
FIG. 3B (Prior Art) is a corresponding tracking error signal.

Referring to FIG. 3A and FIG. 3B; wherein FIG. 3A is a diagram illustrating the cross tracking of the laser beam, while FIG. 3B is a corresponding tracking error signal. When a laser beam 304 shifts upwards, the photo-dioxide 210 receives the light reflected from a track 302, while the photo-dioxide 212 receives a beam of light not reflected from the track 302. Therefore, when the signal received by the photo-dioxide 212 is an intensified signal, the tracking error signal generated is positive (TE=F−E>0), otherwise a negative tracking error signal is generated. If the laser beam is projected on the tracks at the same time, the reflected light received by the photo-dioxide 210 and that received by the photo-dioxide 212 would have the same intensity, meanwhile, the tracking error signal is 0, and each T represents a tracking cross signal period as shown in FIG. 3B.

Currently, DVD disc has several ways to store data therein. For example, a dual disc needs to incorporate the mechanism of layer jump to access data. In FIG. 1, the objective lens 114 is focusing on the recoding layer 102. However, when the optical pick-up head is to access data from the recoding layer 104, the objective lens 114 would be shifted upwardly for the focal point 116 to fall on the recoding layer 104. Contrary, if the optical disc drive needs to turn back to access data from the recoding layer 102, a layer jump would be performed for the focal point 116 to be shifted backwardly to the recoding layer 102 from the recoding layer 104.

However, the eccentricity due to different specifications of discs and spindle motors manufactured by different manufacturers would cause the disc to vibrate and wobble when rotated. And as the rotation rate of the optical disc drive becomes faster and faster, the vibration and wobbling would only get worse not less. Moreover, the outer the tracks on the disc, the worse the wobbling. The layer jump according to prior art directly changes to a target position on another recoding layer from an original position on a recoding layer when the target position is at outer tracks of the disc and the disc is still wobbling. During layer jump, the difficulty in focusing is very likely to cause the focal point 116 to fall on either between the recoding layer 102 and the recoding layer 104 or above the recoding layer 104, thereby ending up with focusing failure. Meanwhile, the focus error signals detected by the optical pick-up head are all equal to 0. Under such circumstances, even focusing compensation technique would not do any good. Moreover, the position of the objective lens 114 after failure in layer jump is normally unknown, so the focusing process has to start from the beginning, which would spend a longer time and result in a poor data accessing efficiency.

SUMMARY OF THE INVENTION

The object of the invention is to provide an intelligent layer jump method. The relative position between an original position and a target position is determined firstly to determine subsequent steps of layer jump path. More precisely, the layer jump always occurs when the original position and the target position are at inner tracks of the disc, thereby improving the success rate of focusing after layer jump.

According to the above object, the invention provides an intelligent layer jump method applied in an optical disc drive to access an optical recording medium of the disc. The optical recording medium has at least a first recoding layer and a second recoding layer. The first recoding layer has a number of first tracks, while the second recoding layer has a number of second tracks. Firstly, a light beam is focused on the first recoding layer to form a focal point and obtain an original position. Then, the relative position between the original position and the target position positioned on the second recoding layer are compared to determine a layer jump and track seeking path of the focal point. Finally, the focal point is shifted from the original position to the target position according to the predetermined layer jump and track seeking path.

According to the above object, the invention further provides an intelligent layer jump method for shifting a focal point of an optical disc drive from an original position on a first recoding layer of a disc to a target position on a second recoding layer of the disc. The first recoding layer has a number of first tracks. The second recoding layer has a number of second tracks. The original position is positioned on one of the first tracks. The target position is positioned on one of the second tracks. Firstly, a layer jump path is determined according to the original position and the target position. Then, the focal point is shifted from the original position to the target position according to the layer jump path.

Other objects, features, and advantages of the invention will become apparent from the following detailed description of the preferred but non-limiting embodiments. The following description is made with reference to the accompanying drawings.

DETAILED DESCRIPTION OF THE INVENTION

Layer jump method according to prior art is likely to experience focusing failure after layer jump when outer tracks of the disc are at a high rotation rate. The object of the invention aiming at resolving the above problems is exemplified by a preferred embodiment disclosed below.

Figure 4:
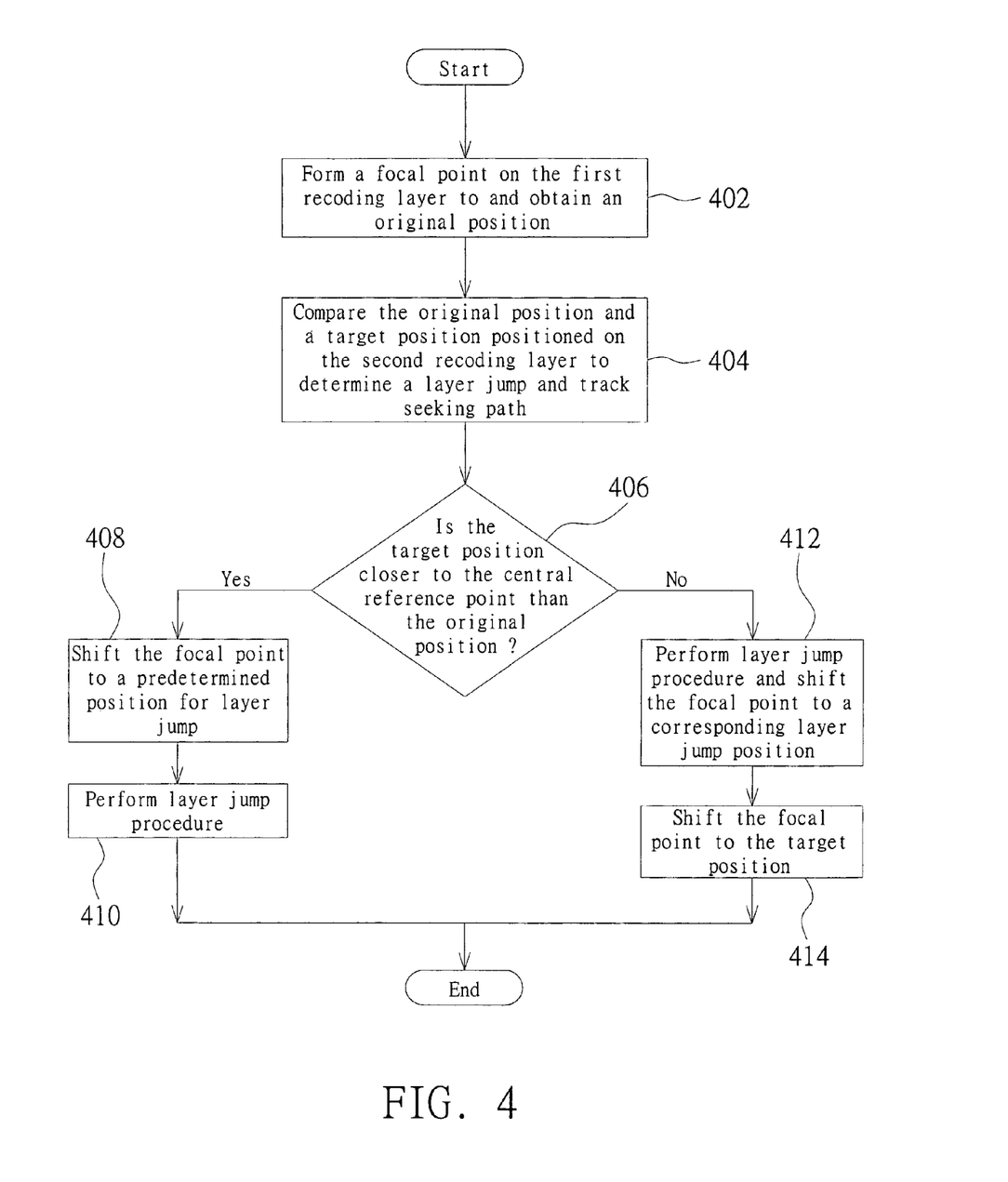
FIG. 4 is a flowchart illustrating the intelligent layer jump method according to a preferred embodiment of the invention.
Figure 5:
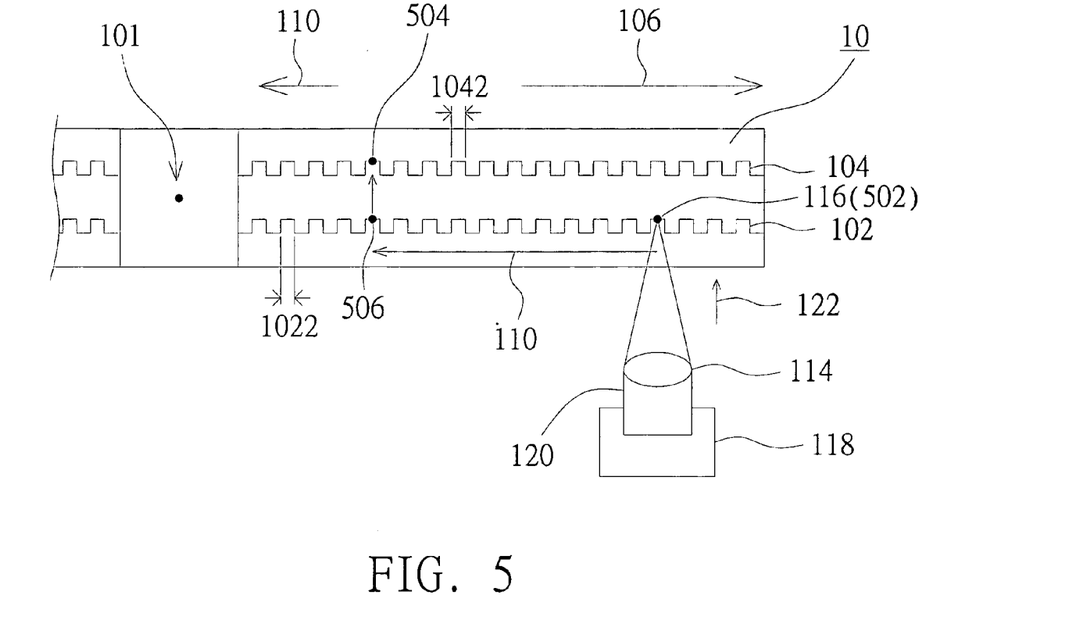
FIG. 5 is a diagram illustrating a first layer jump process on a disc according to a preferred embodiment of the invention.
Figure 6:
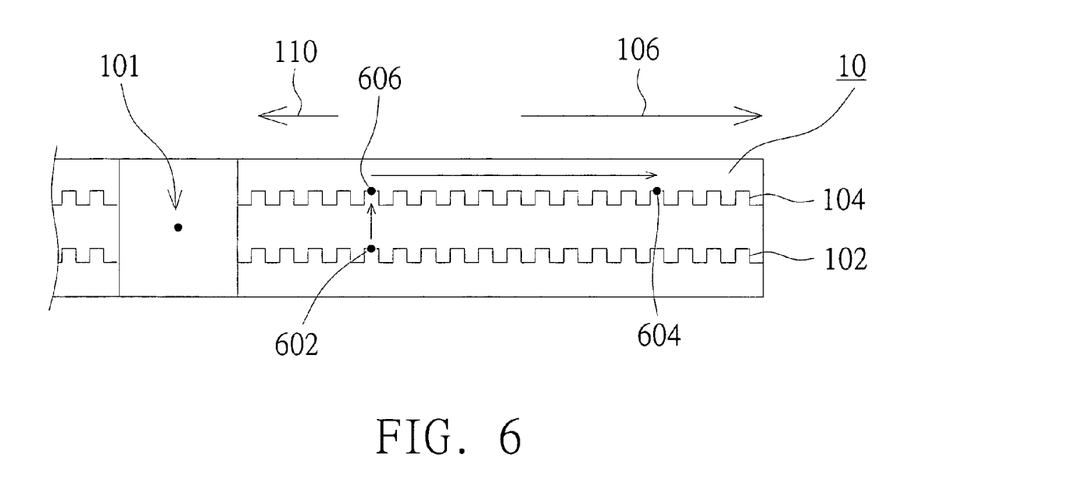
FIG. 6 is a diagram illustrating a second layer jump process on a disc according to a preferred embodiment of the invention.

Referring to FIG. 4 to FIG. 6, wherein FIG. 4 is a flowchart illustrating the intelligent layer jump method according to a preferred embodiment of the invention, FIG. 5 is a diagram illustrating a first layer jump process on a disc according to a preferred embodiment of the invention, and FIG. 6 is a diagram illustrating a second layer jump process on a disc according to a preferred embodiment of the invention.

The intelligent layer jump method according to a preferred embodiment of the invention is applied in an optical disc drive to access an optical recording medium such as disc 10. The disc 10 has a first recoding layer 102 and a second recoding layer 104. The first recoding layer 102 has a number of first tracks 1022, while the second recoding layer 104 has a number of corresponding second tracks 1042. The disc 10 is preferably a digital versatile disc (DVD) with dual recoding layers.

In step 402, firstly, the laser beam projected from the optical pick-up head 118 is focused on the first recoding layer 102 to form a focal point 116 and obtain an original position 502 as shown in FIG. 5.

Next, in step 404, the optical pick-up head 118 receives an instruction to perform layer jump. Meanwhile, instead of performing layer jump directly, the focal point 116, first of all, compares the relative position between the original position on the first recoding layer 102 and the target position on the second recoding layer 104 to determine the layer jump and track seeking path of the focal point 116. The relative position between the original position and the target position is determined according to the sector number.

In step 406, the optical pick-up head 118 shifts the focal point 116 from the original position to the target position according to the predetermined layer jump and track seeking path. In FIG. 5, if the result of comparison turns out to be a target position 504 being positioned on inner tracks of the disc 10 than the original position 502, i.e., the target position 504 closer to the central reference point 101 than the original position 502, then the optical disc drive is switched to an open looped system. The seeking servo drives the optical pick-up head 118 to shift towards the center of the disc 110 for the focal point 116 to be shifted to a predetermined position for layer jump 506 with the first track 1022 being partly crossed over, wherein the predetermined position for layer jump 506 corresponds to the target position 504. During the seeking process, the seeking servo can use the tracking cross signal to count the number of tracks crossed over.

Next, in step 410, the focusing servo controls an actuator 120 and drives an objective lens 114 to shift towards a direction 122 perpendicular to the disc direction, so that the focal point 116 is shifted upward accordingly to perform layer jump. Lastly, the focal point 116 is held on the second recoding layer 104 and follows one of the second tracks 1042 to be shifted to the target position 504, and the whole process of layer jump and focusing is completed here. Meanwhile, the optical disc drive is at close looped system, and the optical pick-up head 118 is controlled by a tracking servo.

To the contrary, in FIG. 6, if the result of comparison is the target position 604 being positioned on outer tracks of the disc 10 than the original position 602, i.e., farther from the central reference point 101, then the optical disc drive is switched to an open looped system. Next, proceed to the step of focus jump (perform layer jump procedure and shift the focal point to a corresponding layer jump position as step 412 in FIG. 4), the focusing servo controls the actuator 120 and drives the objective lens 114 to be shifted towards a direction 122 perpendicular to the disc direction, so that the focal point 116 is shifted upwardly to a corresponding layer jump position 606 on the second recoding layer 104 as shown in the step 412 of FIG. 4.

In step 414, the seeking servo controls an optical pick-up head 118 to shift in a direction 106 departing from the center of the disc, so that the focal point 116 on the second recoding layer 104 is shifted to the vicinity of the target position 604 and is held with the second track 1042 being partly crossed over. Then, when a focus error signal is received by the focusing servo, the hold procedure is finished. Meanwhile, the optical disc drive is switched to a close looped system. Lastly, the focal point 116 on the second recoding layer 104 follows one of the second tracks 1042 to be shifted to a target position 604.

Apart from the two layer jump processes disclosed above, other layer jump processes of the intelligent layer jump method according to a preferred embodiment of the invention are disclosed below.

Figure 7:
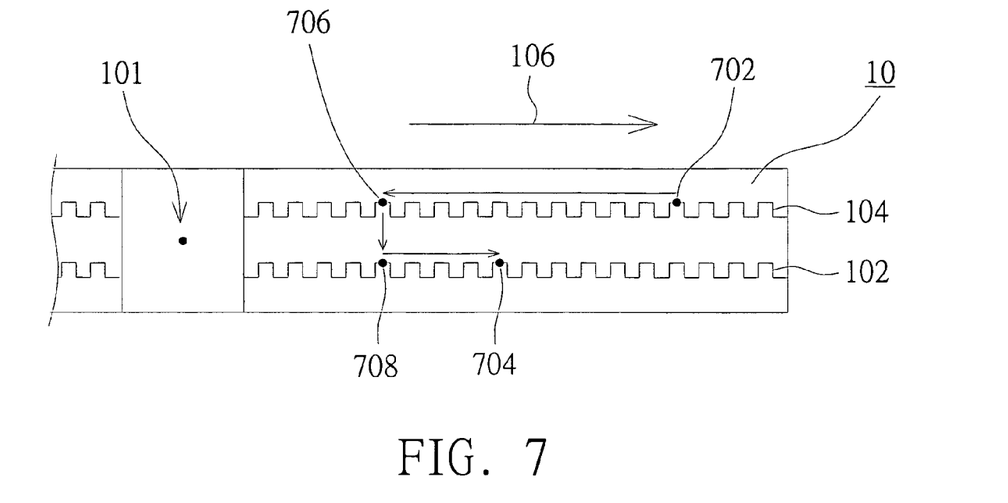
FIG. 7 is a diagram illustrating a third layer jump process on a disc according to a preferred embodiment of the invention.

Referring to FIG. 7, a diagram illustrating a third layer jump process on a disc according to a preferred embodiment of the invention is shown. When a target position 704 is closer to the central reference point 101 than an original position 702, the layer jump path is set to be a sequential seek-jump-seek path. The steps are disclosed below. The focal point 116, following the direction of the central reference point 101, is shifted from the original position 702 to a predetermined position for layer jump 706 on the second recoding layer 104 through track seeking. The address or the time point of the predetermined position for layer jump 706 is closer to the central reference point 101 than the address or the time point of the target position 704. Next, the focal point 116 is shifted from the predetermined position for layer jump to a corresponding layer jump position 708 on the first recoding layer 102 through layer jump, and the address or the time point of the corresponding layer jump position 708 is the same with the address or the time point of the predetermined position for layer jump 706. Lastly, the focal point 116 is shifted from the corresponding layer jump position 708 to the target position 704 through track seeking.

Figure 8:
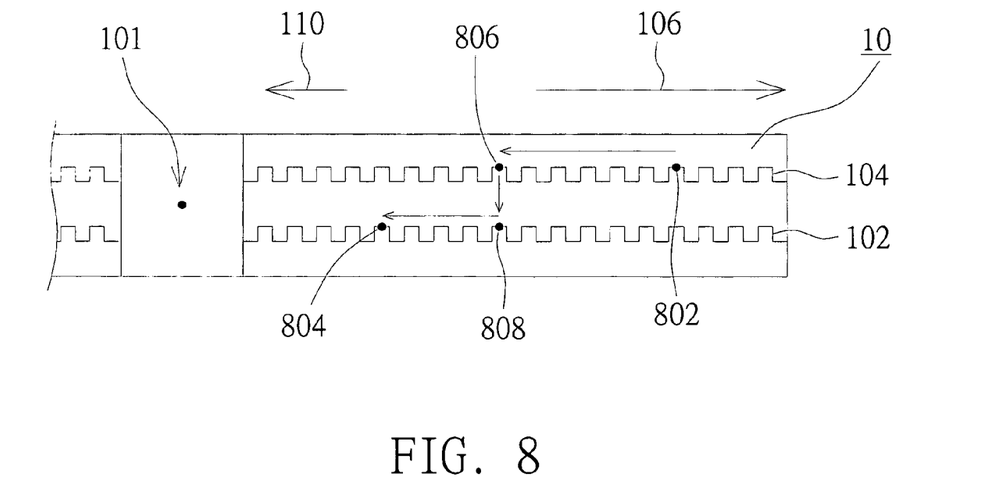
FIG. 8 is a diagram illustrating a fourth layer jump process on a disc according to a preferred embodiment of the invention.

Referring to FIG. 8, a diagram illustrating a fourth layer jump process on a disc according to a preferred embodiment of the invention is shown. When a target position 804 is closer to the central reference point 101 than an original position 802, the layer jump path is set to be a sequential seek-jump-seek path. The steps are disclosed below. The focal point 116 is shifted from the original position 802 towards the direction of the central reference point 101with the second track 1042 being partly crossed over to the predetermined position for layer jump 806 on the second recoding layer 104 through track seeking, wherein the predetermined position for layer jump 806 is closer to the central reference point 101 than the target position 804. Next, the focal point 116 is shifted from the predetermined position for layer jump 806 to a corresponding layer jump position 808 on the first track 1022 through layer jump, while the address or the time point of the corresponding layer jump position 808 is the same with the address or the time point of the predetermined position for layer jump 806. Lastly, the focal point 116 is held and shifted from the corresponding layer jump position 808 to the target position 804 through track seeking.

Figure 9:
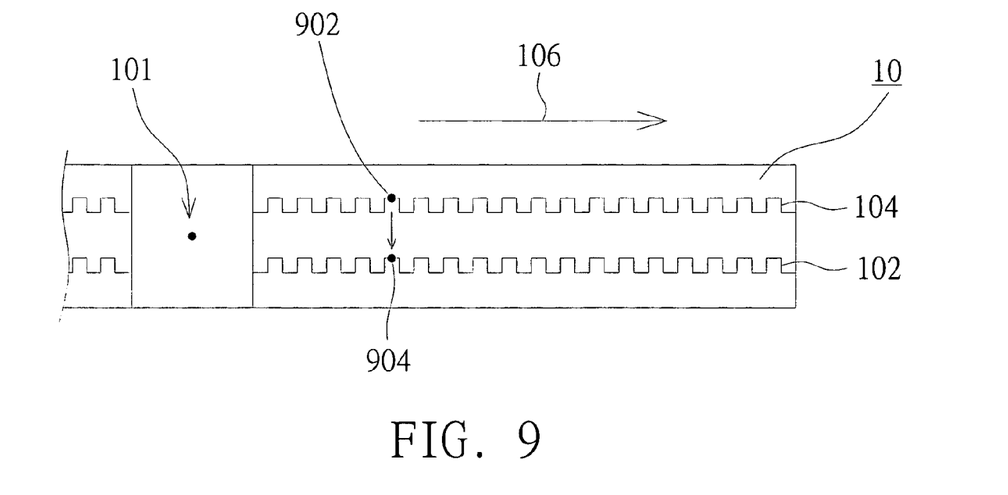
FIG. 9 is a diagram illustrating a fifth layer jump process on a disc according to a preferred embodiment of the invention.

Referring to FIG. 9, a diagram illustrating a fifth layer jump process on a disc according to a preferred embodiment of the invention is shown. When a target position 904 and an original position 902 have the same distance from the central reference point 101 and are positioned on inner tracks of the disc 10, the focal point 116 is directly shifted from the original position 902 to the target position 904 through layer jump.

Figure 10:
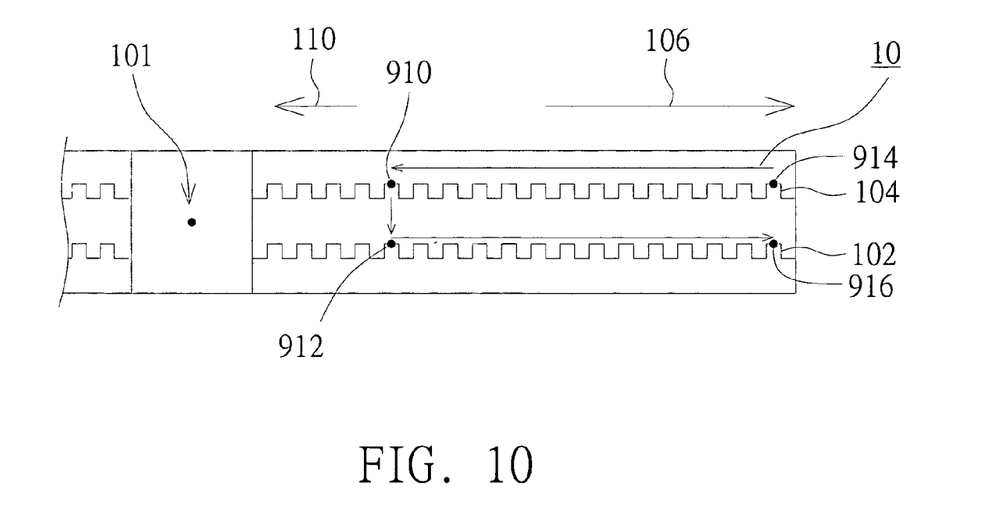
FIG. 10 is a diagram illustrating a sixth layer jump process on a disc according to a preferred embodiment of the invention.

Referring to FIG. 10, a diagram illustrating a sixth layer jump process on a disc according to a preferred embodiment of the invention is shown. When the address or the time point of a target position 908 is the same with the address or the time point of the original position 906, but at an outer track of the disc 10, the layer jump path is determined to be a sequential seek-jump-seek path. For example, the second track in which the original position is disposed is a second outmost track 914, while the first track in which the target position is disposed is a first outmost track 916. The steps are disclosed as follows. The focal point 116 is shifted from the original position 914 to the predetermined position for layer jump 910 through track seeking, while the predetermined position for layer jump 910 is closer to central reference point 101 than the original position 914 and the target position 916. The focal point 116 is shifted from the predetermined position for layer jump 910 to a corresponding layer jump position 912 through layer jump. Lastly, the focal point 116 is shifted from the corresponding layer jump position 912 to the target position 916 through track seeking.

Figure 11:
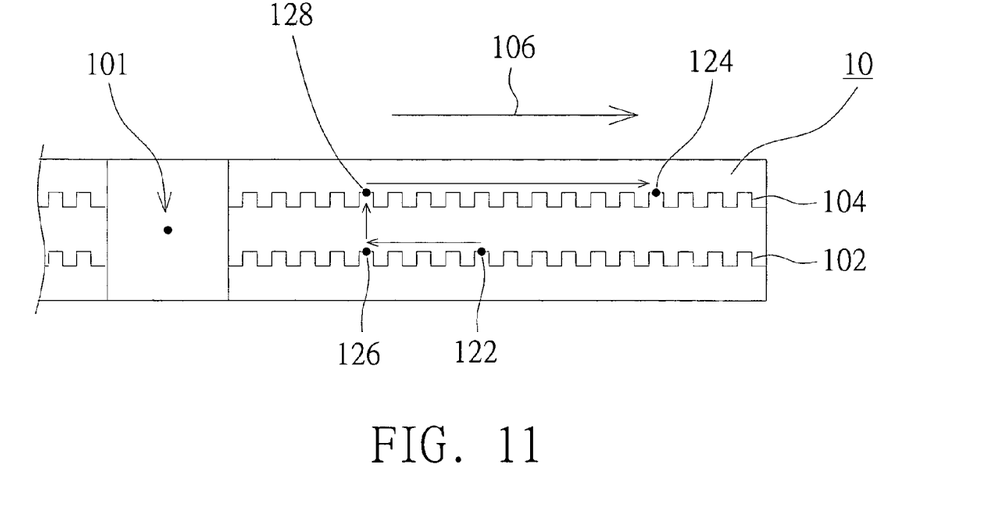
FIG. 11 is a diagram illustrating a seventh layer jump process on a disc according to a preferred embodiment of the invention.

Referring to FIG. 11, a diagram illustrating a seventh layer jump process on a disc according to a preferred embodiment of the invention is shown. When a target position 124 is farther from central reference point 101 than an original position 122, the layer jump path is determined to be a sequential seek-jump-seek path. The steps are as follows. Firstly, the focal point 116 is shifted from the original position 122 to a predetermined position for layer jump 126 on the first recoding layer 102 through track seeking, while the address or the time point of the predetermined position for layer jump 126 is closer to the central reference point 101 than the original position 122. Next, the focal point 116 is shifted from the predetermined position for layer jump 126 to a corresponding layer jump position 128 on the second recoding layer 104 through layer jump, while the address or the time point of the corresponding layer jump position 128 is the same with the address or the time point of the predetermined position for layer jump 126. Lastly, the focal point 116 is shifted from the corresponding layer jump position 128 to the target position 124 through track seeking.

Figure 12:
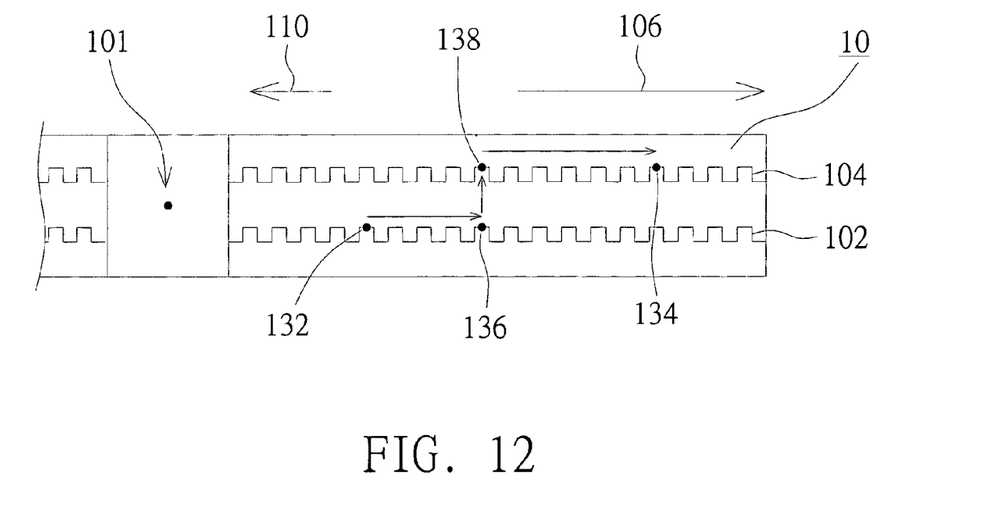
FIG. 12 is a diagram illustrating an eighth layer jump process on a disc according to a preferred embodiment of the invention.

Referring to FIG. 12, a diagram illustrating a eighth layer jump process on a disc according to a preferred embodiment of the invention is shown. When a target position 134 is farther from central reference point 101 than an original position 132, the layer jump path is determined to be a sequential seek-jump-seek path. The steps are as follows. Firstly, the focal point 116 is shifted from the original position 132 to a predetermined position for layer jump 136 on the first recoding layer 102 through track seeking, while the address or the time point of the predetermined position for layer jump 136 is between the address or the time point of the original position 132 and the address or the time point of the target position 134. Next, the focal point 116 is shifted from the predetermined position for layer jump 136 to a corresponding layer jump position 138 on the second recoding layer 104 through layer jump. Lastly, the focusing is completed and the focal point 116 is shifted from the corresponding layer jump position 138 to the target position 134 through track seeking.

It can be seen from the above embodiment that the intelligent layer jump method according to preferred embodiment of the invention is capable of making wise decision enabling the optical disc drive to determine the relative position between the original position and the target position first, then determine a better layer jump path before performing focus jump (perform layer jump procedure and shift the focal point to a corresponding layer jump position as step 412 in FIG. 4). No matter what the path is, the focal points are always positioned on inner tracks of the disc when performing layer jump, thereby increasing the success rate of focusing after layer jump and effectively overcoming the inadequacies of prior art. Therefore, the rotation rate of the optical disc drive can be speed up to further increase the data accessing rate. Consequently, product compatibility is largely improved.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A layer jump method applied when an optical disc drive accesses a disc, which has a central reference point, at least a first recoding layer and a second recoding layer, wherein the first recoding layer has a plurality of first tracks, the second recoding layer has a plurality of second tracks, and the method comprises:

focusing a laser beam of the optical disc drive on the first recoding layer to form a focal point and obtain an original position;

comparing a relative position between the original position and a target position positioned on the second recoding layer;

shifting the focal point to a predetermined position for layer jump on the first recoding layer with the first tracks being partly crossed over when the target position is closer to the central reference point than the original position, wherein the predetermined position for layer jump corresponds to the target position; and performing focus jump to shift the focal point to the target position.

2. The method according to claim 1, wherein the disc is a digital versatile disc (DVD) having dual recoding layers.

3. The method according to claim 1, wherein the relative position between the original position and the target position is determined according to the sector number.

4. A layer jump method applied when an optical disc drive accesses a disc, which has a central reference point, at least a first recoding layer and a second recoding layer, wherein the first recoding layer has a plurality of first tracks, the second recoding layer has a plurality of second tracks, and the method comprises:

focusing a laser beam of the optical disc drive on the first recoding layer to form a focal point and obtain an original position;

comparing a relative position between the original position and a target position positioned on the second recoding layer;

shifting the focal point to a predetermined position for layer jump on the first recoding layer with the first tracks being partly crossed over when the target position is closer to the central reference point than the original position, wherein the predetermined position for layer jump is closer to the central reference point than target position;

shifting the focal point from the predetermined position for layer jump to a corresponding layer jump position on the second recoding layer through layer jump, wherein the corresponding layer jump position is closer to the central reference point than the target position; and shifting the focal point from the corresponding layer jump position to the target position on the second recoding layer with the second tracks being partly crossed over.

5. A layer jump method applied when an optical disc drive accesses a disc, which has a central reference point, at least a first recoding layer and a second recoding layer, wherein the first recoding layer has a plurality of first tracks, the second recoding layer has a plurality of second tracks, and the method comprises:

focusing a laser beam of the optical disc drive on the first recoding layer to form a focal point and obtain an original position;

comparing a relative position between the original position and a target position positioned on the second recoding layer;

shifting the focal point toward the central reference point to a predetermined position for layer jump on the first recoding layer when the target position is closer to the central reference point than the original position, wherein the predetermined position for layer jump is farther from the central reference point than the target position;

shifting the focal point from the predetermined position for layer jump to a corresponding layer jump position on the second recoding layer through layer jump, wherein the corresponding layer jump position is farther from the central reference point than the target position; and shifting the focal point from the corresponding layer jump position to the target position on the second recoding layer.

6. A layer jump method applied when an optical disc drive accesses a disc, which has a central reference point, at least a first recoding layer and a second recoding layer, wherein the first recoding layer has a plurality of first tracks, the second recoding layer has a plurality of second tracks, and the method comprises:

focusing a laser beam of the optical disc drive on the first recoding layer to form a focal point and obtain an original position;

comparing a relative position between the original position and a target position positioned on the second recoding layer, wherein the target position and the original position have the same distance from the central reference point;

shifting the focal point from the original position to a predetermined position for layer jump on the first recoding layer with the first tracks being partly crossed over, wherein the predetermined position for layer jump is closer to the central reference point than the original position;

shifting the focal point from the predetermined position for layer jump to a corresponding layer jump position on the second recoding layer through layer jump, wherein the corresponding layer jump position is closer to the central reference point than the target position; and shifting the focal point from the corresponding layer jump position to the target position on the second recoding layer.

7. A layer jump method for shifting a focal point of an optical disc drive from an original position on a first recoding layer of a disc to a target position on a second recoding layer of the disc, wherein the first recoding layer has a plurality of first tracks, the second recoding layer has a plurality of second tracks, the original position is positioned on one of the first tracks, the target position is positioned on one of the second tracks, and the disc has a central reference point corresponding to a predetermined position for layer jump on the first tracks, the address or the time point of the predetermined position for layer jump being the same with the address or the time point of the target position, and the method comprises:

determining a layer jump path according to the original position and the target position, wherein the layer jump path is determined to be a sequential seek-and-jump path when the target position is closer to the central reference point than the original position; and shifting the focal point from the original position to the target position according to the layer jump path.

8. The method according to claim 7, wherein the step of shifting the focal point from the original position to the target position according to the layer jump path further comprises:

shifting the focal point from the original position to the predetermined position for layer jump through track seeking; and shifting the focal point from the predetermined position for layer jump to the target position through layer jump.

9. A layer jump method for shifting a focal point of an optical disc drive from an original position on a first recoding layer of a disc to a target position on a second recoding layer of the disc, wherein the first recoding layer has a plurality of first tracks, the second recoding layer has a plurality of second tracks, the original position is positioned on one of the first tracks, the target position is positioned on one of the second tracks, and the disc has a central reference point, wherein the method method comprises:

determining a layer jump path according to the original position and the target position, wherein the layer jump path is determined to be a sequential seek-and-jump path when the target position is closer to the central reference point than the original position; and     shifting the focal point from the original position to the target position according to the layer jump path.

10. The method according to claim 9, wherein the step of shifting the focal point from the original position to the target position according to the layer jump path further comprises:

shifting the focal point from the original position to a predetermined position for layer jump on the first tracks through track seeking, wherein the address or the time point of the predetermined position for layer jump is between the address or the time point of the original position and the address or the time point of the target position;

shifting the focal point from the predetermined position for layer jump to a corresponding layer jump position on the second tracks through layer jump, wherein the address or the time point of the corresponding layer jump position is the same with the address or the time point of the predetermined position for layer jump; and     shifting the focal point from the corresponding layer jump position to the target position through track seeking.

11. The method according to claim 9, wherein the step of shifting the focal point from the original position to the target position according to the layer jump path further comprises:

shifting the focal point from the original position to a predetermined position for layer jump on the first tracks through track seeking, wherein the predetermined position for layer jump is closer to the central reference point than target position;

shifting the focal point from the predetermined position for layer jump to a corresponding layer jump position on the second tracks through layer jump, wherein the address or the time point of the corresponding layer jump position is the same with the address or the time point of the predetermined position for layer jump; and     shifting the focal point from the corresponding layer jump position to the target position through track seeking.

12. A layer jump method for shifting a focal point of an optical disc drive from an original position on a first recoding layer of a disc to a target position on a second recoding layer of the disc, wherein the first recoding layer has a plurality of first tracks, the second recoding layer has a plurality of second tracks, the original position is positioned on one of the first tracks, and the target position is positioned on one of the second tracks, and the disc has a central reference point, wherein the method comprises:

determining a layer jump path according to the original position and the target position, wherein the layer jump path is determined to be a sequential seek-and-jump path when the target position is farther from the central reference point than the original position; and     shifting the focal point from the original position to the target position according to the layer jump path.

13. The method according to claim 12, wherein the step of shifting the focal point from the original position to the target position according to the layer jump path further comprises:

shifting the focal point from the original position to a predetermined position for layer jump on the first tracks through track seeking, wherein the address or the time point of the predetermined position for layer jump is between the address or the time point of the original position and the address or the time point of the target position;

shifting the focal point from the predetermined position for layer jump to a corresponding layer jump position on the second tracks through layer jump, wherein the address or the time point of the corresponding layer jump position is the same with the address or the time point of the predetermined position for layer jump; and     shifting the focal point from the corresponding layer jump position to the target position through track seeking.

14. The method according to claim 12, wherein the step of shifting the focal point from the original position to the target position according to the layer jump path further comprises:

shifting the focal point from the original position to a predetermined position for layer jump on the first tracks through track seeking, wherein the address or the time point of the predetermined position for layer jump is closer to the central reference point than the original position; shifting the focal point from the predetermined position for layer jump to a corresponding layer jump position on the second tracks through layer jump, wherein the address or the time point of the corresponding layer jump position is the same with the address or the time point of the predetermined position for layer jump; and     shifting the focal point from the corresponding layer jump position to the target position through track seeking.

15. A layer jump method for shifting a focal point of an optical disc drive from an original position on a first recoding layer of a disc to a target position on a second recoding layer of the disc, wherein the first recoding layer has a plurality of first tracks, the second recoding layer has a plurality of second tracks, the original position is positioned on one of the first tracks, the target position is positioned on one of the second tracks, and the disc has a central reference point, wherein the method comprises:

determining a layer jump path according to the original position and the target position, wherein the layer jump path is determined to be a sequential seek-and-jump path when the address or the time point of the target position is the same with the address or the time point of the original position; and     shifting the focal point from the original position to the target position according to the layer jump path.

16. The method according to claim 12, wherein the step of shifting the focal point from the original position to the target position according to the layer jump path further comprises:

shifting the focal point from the original position to a predetermined position for layer jump on the first tracks through track seeking, wherein the predetermined position for layer jump is closer to the central reference point than the original position and the target position;

shifting the focal point from the predetermined position for layer jump to a corresponding layer jump position on the second tracks through layer jump, wherein the address or the time point of the corresponding layer jump position is the same with the address or the time point of the predetermined position for layer jump; and     shifting the focal point from the corresponding layer jump position to the target position through track seeking.

* * * * *